(No Model.)
F. O. CLAPP & J. C. BAILEY.
DRAFT FRAME FOR TWO WHEELED CARTS.
No. 562,355. Patented June 16, 1896.
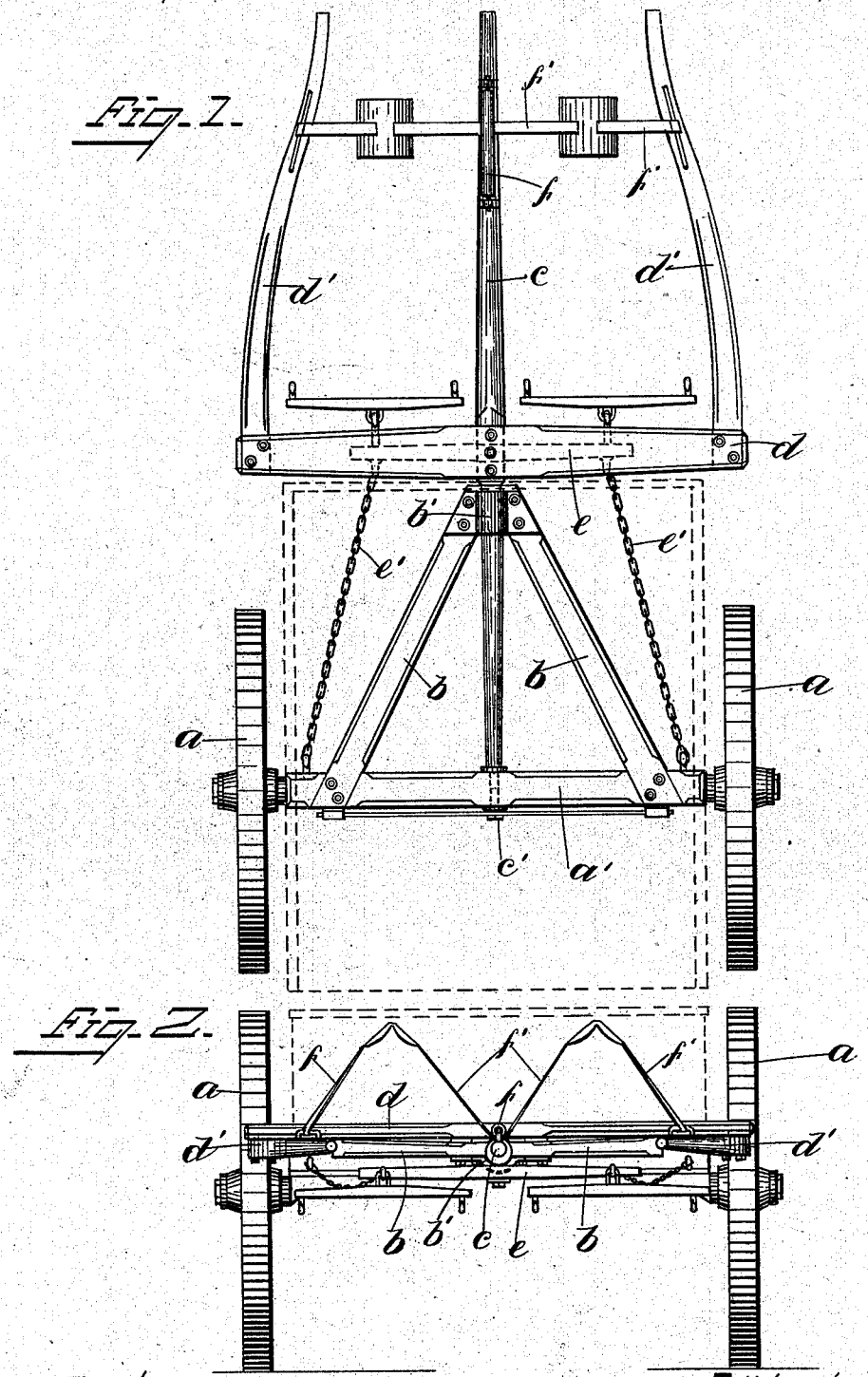
WITNESSES
Charles B. Crocker.
F. H. Davis.
INVENTORS
Frank O. Clapp.
James C. Bailey.
by B. J. Noyes, atty.

UNITED STATES PATENT OFFICE.

FRANK O. CLAPP AND JAMES C. BAILEY, OF SCITUATE, MASSACHUSETTS.

DRAFT-FRAME FOR TWO-WHEELED CARTS.

SPECIFICATION forming part of Letters Patent No. 562,355, dated June 16, 1896.

Application filed November 11, 1895. Serial No. 568,558. (No model.)

*To all whom it may concern:*

Be it known that we, FRANK O. CLAPP and JAMES C. BAILEY, of Scituate, county of Plymouth, State of Massachusetts, have invented an Improvement in Draft-Frames for Two-Wheeled Carts, of which the following description, in connection with the accompanying drawings, is a specification, like letters on the drawings representing like parts.

Ordinary two-wheeled carts now in common use for farming purposes are constructed and arranged to be drawn by a single horse, and the shafts are rigidly secured to the body or frame of the cart, and as a result the horse feels all the movements of the cart as it passes over stones and inequalities of the ground.

This invention has for its object to provide a two-wheeled cart of this kind with means whereby it may be drawn with a pair of horses and whereby all movements of the cart, consequent to passing over stones or inequalities of the ground, are independent of the draft devices, and therefore not felt by the horses.

In carrying out this invention a pole or tongue is provided which is swiveled to the frame of the cart, so that the cart is free to rock or tip to the right or left independently of said pole or tongue. A cross-piece is rigidly secured to said pole or tongue in advance of the frame, to the extremities of which shafts are secured. Another cross-piece or doubletree is pivotally connected to the pole or tongue which supports the whiffletrees, said pivoted doubletree being preferably connected by suitable chains with the frame, said chains being made of such length as to give ample yet a limited movement to the pivoted or swinging doubletree. The swiveled pole or tongue is made detachable, so that it may be easily removed, and then by detaching the chains the entire draft devices may be removed. A roll is preferably mounted on the pole or tongue at a suitable distance from its end, beneath which passes a back-band which is adapted to be connected with the saddles on the horses, thereby permitting certain independent play of the pole or tongue, and giving to each horse certain freedom of motion.

Figure 1 shows in plan view a cart provided with draft devices embodying this invention, the body of the cart being represented by dotted lines; Fig. 2, an end view showing particularly the back-band connecting the two saddles passing under a roll on the pole or tongue.

The axletree $a$, adapted to receive upon it the wheels $a'$, has two forwardly-projecting braces $b$ arranged at an oblique angle and approaching each other toward the front end, and at the forward junction of said braces a loop or socket $b'$ is formed by metallic straps, bands, or otherwise. The axletree $a$ has a hole through it in line with the loop or socket $b'$, and a pole $c$ passes through said hole or socket and thence through the hole in the axletree, its rear end receiving upon it a suitable nut $c'$. The pole or tongue $c$ is thus swiveled to the frame, and is easily detachable.

The cross-bar $d$ is rigidly secured to the pole or tongue $c$, to the extremities of which shafts $d'$ are rigidly secured. The doubletree $e$ is pivoted to the pole or tongue $c$, which supports the whiffletrees, and said doubletree is connected with the axletree $a$ by chains $e'$, which give a certain amount of play to said doubletree and brings the draft on the axletree. The pole or tongue $c$ and parts attached to and connected with it constitute said draft devices, and as the pole or tongue is swiveled to the frame it will be seen that the cart may rock or tip to the right or left as may be necessary in passing over stones or inequalities of the ground independently of said draft devices.

To give the horses certain freedom of motion and equalize the load, a roll $f$ is mounted on the pole or tongue, and a back-band $f'$ passes beneath said roll, the ends of which are attached to or connected with the saddles. This latter device, however, forms but a feature of the invention, and may not be necessary in some cases.

We claim—

1. A cart having the pole or tongue $c$ capable of turning on a horizontal axis, the cross-bar $d$ rigidly secured to said pole or tongue, the shafts $d'$, $d'$ rigidly attached to the ends of said cross-bar to thereby form a rigid frame for a double team, which turns on a horizontal axis, substantially as described.

2. A cart having the pole or tongue $c$ capable of turning on a horizontal axis, the cross-bar $d$ rigidly secured to said pole or tongue, the shafts $d'$, $d'$ rigidly attached to the ends of said cross-bar to thereby form a rigid frame for a double team, which turns on a horizontal axis, the swinging doubletree attached to said frame, and the singletrees attached to said doubletree, substantially as described.

3. A cart having the pole or tongue $c$ capable of turning on a horizontal axis, the cross-bar $d$ rigidly secured to said pole or tongue, the shafts $d'$, $d'$ rigidly attached to the ends of said cross-bar to thereby form a rigid frame for a double team, which turns on a horizontal axis, the swinging doubletree attached to said frame, and the singletrees attached to said doubletree, and chains $e'$, $e'$ connecting the ends of said doubletree with the axle, substantially as described.

4. A cart having draft devices swiveled to it comprising the pole or tongue $c$ having thereon a roll $f$ combined with a back-band which passes under and is freely movable beneath said roll and extends to the saddles, and shafts $d'$, $d'$, rigidly connected with said pole or tongue, and provided with devices to which the back-bands are attached, substantially as described.

5. The pole or tongue $c$ having thereon a roll $f$, combined with a back-band which passes under and is freely movable beneath said roll and extends to the saddles, substantially as described.

In testimony whereof we have signed our names to this specification in the presence of two subscribing witnesses.

FRANK O. CLAPP.
JAMES C. BAILEY.

Witnesses:
A. J. WATERMAN,
LUCIA D. WATERMAN.